United States Patent
Nahmias Nanni et al.

(10) Patent No.: US 6,820,666 B2
(45) Date of Patent: Nov. 23, 2004

(54) TIRE, INCLUDING FIBER-REINFORCED ELASTOMERIC INTERMEDIATE LAYER BETWEEN THE BELT STRUCTURE AND TREAD BAND, AND METHOD OF MAKING THE TIRE

(75) Inventors: Marco Nahmias Nanni, Milan (IT); Antonio Brunacci, Gran Duché de Luxembourg (LU); Claudio Zanichelli, Nebbiuno (IT)

(73) Assignee: Pirelli Pneumatici S.p.A., Milan (IT)

( * ) Notice: Subject to any disclaimer, the term of this patent is extended or adjusted under 35 U.S.C. 154(b) by 167 days.

(21) Appl. No.: 09/843,227

(22) Filed: Apr. 27, 2001

(65) Prior Publication Data

US 2002/0017347 A1 Feb. 14, 2002

Related U.S. Application Data (63) Continuation of application No. PCT/EP99/08065, filed on Oct. 26, 1999
(60) Provisional application No. 60/106,627, filed on Nov. 2, 1998.

(30) Foreign Application Priority Data

Oct. 28, 1998 (EP) .............................................. 98120357

(51) Int. Cl.$^7$ .............................. B60C 1/00; B60C 9/18; B60C 11/00
(52) U.S. Cl. ............................... 152/209.4; 152/209.5; 152/458; 152/532; 152/565
(58) Field of Search ............................. 152/209.5, 458, 152/532, 209.4, 565

(56) References Cited

U.S. PATENT DOCUMENTS

| | | | |
|---|---|---|---|
| 3,759,306 A | * 9/1973 | Greiner et al. ........... | 152/209.4 |
| 3,772,130 A | * 11/1973 | Marzocchi .............. | 152/458 X |
| 3,916,968 A | * 11/1975 | Masson ................... | 152/532 X |
| 3,969,568 A | * 7/1976 | Sperley ................... | 152/565 X |
| 4,546,143 A | 10/1985 | Weil et al. | |
| 4,871,004 A | 10/1989 | Brown et al. | |
| 5,226,987 A | 7/1993 | Matsumoto et al. | |
| 5,513,683 A | * 5/1996 | Causa et al. ......... | 152/209.5 X |
| 5,576,104 A | * 11/1996 | Causa et al. ............ | 152/458 X |
| 2002/0148545 A1 | 10/2002 | Nanni et al. | |

FOREIGN PATENT DOCUMENTS

| | | |
|---|---|---|
| CA | 1228282 | 10/1987 |
| EP | 0098353 A2 | 1/1984 |
| EP | 0370664 A2 | 5/1990 |
| EP | 0 592 218 A1 | 4/1994 |
| EP | 0 592 218 B1 | 4/1994 |

(List continued on next page.)

OTHER PUBLICATIONS

English translation of EP 0 652 116 A1.*
English translation of JP 63–263104 A.*
English translation of JP 4–274903 A.*
I. Noriyuki, "Pneumatic Tire", Patent Abstracts of Japan of JP 4–274903, Sep. 30, 1992.
K. Takafumi, "Pneumatic Tire", Patent Abstracts of Japan of JP 61–119407, Jun. 6, 1986.
Patent Abstracts of Japan, JP 55–152,612, High Speed Large Size Pneumatic Tire with High Durability, Hatanaka Takashi, Nov. 28, 1980.

*Primary Examiner*—Adrienne C. Johnstone
(74) *Attorney, Agent, or Firm*—Finnegan, Henderson, Farabow, Garrett & Dunner, L.L.P.

(57) ABSTRACT

A pneumatic tire for vehicle wheels includes a radial carcass, a tread band, sidewalls and beads, and a belt structure. The tread band is provided with grooves on its surface for coming into contact with the ground and situated on a radial outer surface of the carcass. The sidewalls and beads anchor the tire on a wheel rim. The belt structure is disposed between the tread band and the carcass. Additionally, a fiber-reinforced elastomeric intermediate layer is placed between the belt structure and the tread band. Methods for manufacturing the pneumatic tire are also disclosed.

58 Claims, 3 Drawing Sheets

FOREIGN PATENT DOCUMENTS

| | | |
|---|---|---|
| EP | 0 604 108 A1 | 6/1994 |
| EP | 0 604 108 B1 | 6/1994 |
| EP | 0 652 116 A1 | 5/1995 |
| EP | 0 691 218 A2 | 1/1996 |
| EP | 0698510 A2 | 2/1996 |
| EP | 0 904 958 A2 | 3/1999 |
| EP | 0978533 A1 | 2/2000 |
| FR | 2.215.331 | 8/1974 | |
| JP | 63263104 A * | 10/1988 | ............... 152/209.4 |
| JP | 04274903 A * | 9/1992 | ................. 152/532 |
| JP | 06191208 A * | 7/1994 | ................. 152/532 |
| JP | 08003369 A * | 1/1996 | |
| WO | WO 01/03954 A1 | 1/2001 | |

* cited by examiner

TIRE, INCLUDING FIBER-REINFORCED ELASTOMERIC INTERMEDIATE LAYER BETWEEN THE BELT STRUCTURE AND TREAD BAND, AND METHOD OF MAKING THE TIRE

CROSS-REFERENCES TO RELATED APPLICATIONS

This application is a continuation of International Patent Application No. PCT/EP99/08065, filed Oct. 26, 1999, in the European Patent Office; additionally, Applicants claim the benefit under 35 U.S.C. § 119(e) based on prior-filed, copending provisional application No. 60/106,627, filed Nov. 2, 1998, in the U.S. Patent and Trademark Office; the contents of both of which are relied upon and incorporated herein by reference.

BACKGROUND OF THE INVENTION

1. Field of the Invention

The present invention relates tires and methods for making tires. More specifically, the present invention concerns a tire and a method for making a tire having a particular belt structure.

2. Description of the Related Art

As is known, a tire includes a carcass, a tread band, a pair of sidewalls and reinforcing layers between the tread band and the carcass. The carcass, usually at least a single ply, is turned out at its ends around a pair of bead cores. The bead cores, the ends of the carcass, and whatever filler that may be added between the bead cores and carcass form the beads on either side of the tire.

In the traditional (or known) tire, there are generally at least three rubber layers below the tread band, two belted layers and a 0 degree layer or nylon layer. The nylon layer contains reinforcing cords, preferably of a textile material, and more preferably of a heat-shrinkable material, such as nylon, oriented at 0° (i.e., in a circumferential direction) with respect to the equatorial plane of the tire. The reinforcing cords preferably are disposed in a sheet made of elastomeric compound. The nylon layer is located between the tread band and the belted layers. As understood by those skilled in the art, the nylon layer stabilizes the tire, improves its rolling resistance, and generally enhances its operational characteristics because the nylon layer helps the tire retain its shape when subjected to large centrifugal forces at high speeds. Without the nylon layer, the performance of the tire may be compromised, especially at high speeds.

The two belted layers comprise fine cords, preferably metallic cords, displaced in an elastomeric compound, that crisscross each other and are both angled with respect to the equatorial plane of the tire.

In addition to the three reinforcing layers, the traditional tire may also include a rubber sheet between the nylon layer and the tread band, which must be added because of the manner in which traditional tires are manufactured. As is known, the tread band is, often, a separately manufactured, extruded product. Because it is manufactured separately, the tread band cools to room temperature before it is incorporated into a tire. Upon cooling, the tread band loses tackiness and is less able to stick properly to the underlying layer during construction of the tire. To compensate for the loss of tackiness and to improve the adherence of the tread band to the underlying layer so that the tire may be assembled properly before it is vulcanized, a rubber sheet is added to the underside of the tread band. The rubber sheet is a calendered or coestruded (with the tread band) sheet of an elastomeric compound based on natural rubber that is well known in the art. The rubber sheet is usually 0.2 to 1.0 mm thick. Its tackiness may be attributed to the fact that the rubber sheet is typically made from a compound with a natural rubber content of more than about 50 percent of the polymer amount.

An alternate construction of the traditional tire, known as "cap and base tyre", further includes an underlayer as part of the tread band on the side of the tread band facing the interior of the tire. The underlayer improves handling while reducing the rolling resistance of the tire and is incorporated into the tread band between the tread band and the underlying layer. In this alternate construction, the various layers of the tires are arranged in the following manner from the exterior of the tire to the interior: (1) the tread band, (2) the underlayer, which is incorporated into the underside of the tread band, (3) the rubber sheet, and (4) the 0° nylon layer, which is placed above the belted plies. The underlayer is made from a rubber-based compound and is usually between 1 and 2 mm thick. Since it does not have the same composition and characteristics as the tread band, the thickness of the underlayer is selected so that it will not come into contact with the road when the tire tread wears out.

In situations where the underlayer is made, for example, from a compound with a natural rubber content greater than 50 percent of the polymer amount, the rubber sheet may be omitted because the underlayer will have sufficient tackiness to properly adhere the tread band to the carcass, as described above in relation to the rubber sheet.

This does not mean, however, that the rubber sheet is omitted in every case where the natural rubber content of the overlaying layer is greater than 50%. In some cases, the rubber sheet can be omitted despite the fact that the rubber content of the overlaying layer is less than 50%, for example in the case that other material, able to make the overlaying layer with a good tackiness, are added to the compound, or for example when the tread band is not left to cool.

It is also known in the art to construct elastomeric compounds for tires that are reinforced through the addition of reinforcing fibers. One such example is U.S. Pat. No. 4,871,004 ("the '004 patent"), which describes the addition of Kevlar® pulp (a registered trademark of DuPont) to tire rubber to a point where the Kevlar® has a concentration of 0.2 to 20 parts per hundred of rubber (phr). In the '004 patent, the Kevlar® fibers are described as having a length (L) of 0.2 to 5 mm, a diameter (D) of 0.005 to 0.02 mm, and an aspect ratio (L/D) of greater than about 100. The resulting mixture of fibers and rubber can be used to prepare any one of the described components of a tire: apexes, filler strips, belts, belt overlay, and gum strips. The '004 patent describes some of the advantages of adding reinforcing fibers to an elastomer in the construction of a pneumatic tire, such as its reinforcing effect and the increased stiffness of the resulting tire.

European Patent Number 0 592 218 A1 ("the EPO '218 patent") also describes some of the advantages of adding reinforcing fibers to the rubber for different parts of a pneumatic tire. The EPO '218 patent describes the addition of 16 to 30 parts per hundred of rubber (phr) of short fibers having an average diameter (D) of 0.1 to 0.5 μm, an average length (L) of 40 to 500 μm, and an aspect ratio (L/D) of 100 to 5000. Examples of the fibers that can be added are aramid fibers such as Kevlar®, cotton, nylon, polyester, rayon, and surface treated short fibers such as Nylon 6.

Similarly, European Patent Number 0 604 108 A1 ("the EPO '108 patent") describes the addition of certain types of fibers to reinforce the rubber in a pneumatic tire. The specific fibers discussed by the EPO '108 patent are short fibers of UBEPOL-HE 0100 (available from UBE Industries Limited), i.e., Nylon-6. The fibers are described as having an average diameter (D) of 0.3 $\mu$m, an average length (L) of 300 $\mu$m, and an aspect ratio (L/D) of 1000. The fibers are incorporated into the rubber compound in a concentration of not less than 10 parts per 100 of rubber (phr), and preferably 10 to 30 phr.

SUMMARY OF THE INVENTION

The present invention concerns the construction of an elastomeric intermediate layer between the tread band and the belted plies of a pneumatic tire that replaces the nylon layer of the traditional tire but retains the beneficial characteristics of such structural element. Further, the intermediate layer may replace the rubber sheet if present. Similarly, for the second example of the traditional tire, the present invention provides a construction where the elastomeric intermediate layer replaces the 0° nylon layer, the underlayer, and the rubber sheet (if present), to achieve the same goals.

The Applicant found that replacing one or more layers in the traditional tire by introducing an elastomeric intermediate layer to the tread band made with a fiber-reinforcing material, the present invention realizes at least the same advantages in rolling resistance and handling that are previous realized by the structures of both of the traditional tire designs but it does so while reducing the overall weight of the tire.

Moreover, the replacement of the traditional structures with fewer layers, simplify the construction of a tire.

The present invention contemplates adding short fibers such as Kevlar® (in the form of Kevlar® pulp) to the elastomeric intermediate layer preferably incorporated into the tread band to compensate for the elimination of the traditional 0° nylon layer, rubber sheet (if present), and underlayer (if present) from the construction of the traditional tire designs. The present invention contemplates the addition of short fibers having a trunk portion with a diameter of about 10 microns, a length of about 200 microns, and an aspect ratio of about 20. Together with other features of the present invention, the addition of short fibers (such as Kevlar®) helps to keep the benefits of rolling resistance and handling offered by the two traditional tire designs. Similarly, Twaron® pulp (a registered trademark of Akzo Nobel), another type of pulp including a reinforcing fiber, may be used in the place of Kevlar® pulp. Due to the addition of fibers, the elastomeric intermediate layer also is referred to as a "felted" layer.

The present invention further recognizes that the elastomeric intermediate layer is made from the combination of the short fibers with a compound material. The compound material may comprise natural rubber, emulsion-polymerized styrene butadiene rubber, solution polymerized styrene butadiene rubber, and butadiene rubber. Preferably, the compound material is a combination of about 60% natural rubber with about 40% emulsion-polymerized styrene butadiene rubber. The present invention contemplates adding the short reinforcing fibers to the compound material in a concentration between about 5 and 15 parts per hundred of rubber (phr), preferably between about 7 and 11 phr. Moreover, the present invention contemplates that carbon black will be added to mixture in a concentration between about 20 and 80 phr, preferably between about 50 and 70 phr.

While a uniform cross-section, with a thickness greater than 1 mm, for the fiber-reinforced elastomeric intermediate layer is contemplated, the present invention also recognizes that such layer may be manufactured with an uneven cross-section that may further improve the high speed test and handling characteristics of a tire so constructed. With such a construction, the present invention contemplates that the elastomeric intermediate layer, in cross-section, has thicker edges that together occupy about ⅖ths of the total width of the layer while the central portion occupies the remaining ⅗ths of the width. Moreover, the present invention contemplates that the edge portions are between about 25% to 75%, preferably about 33%, thicker than the central portion. Specifically, the present invention contemplates that the edge regions have a thickness greater than the central region of the elastomeric intermediate layer. The thicker portions of the elastomeric intermediate layer are better able to handle the high amounts of stress that develop at the edges of the tread band during rotation of the tire.

Additionally, the present invention contemplates that thicker regions may be added to the elastomeric intermediate layer in regions where the tread grooves are wider. The wider grooves in the tread act as deflection points where stresses can accumulate when the tire rotates. Adding thickness to the elastomeric intermediate layer in these regions helps to reduce the stresses during rotation of the tire.

The present invention also contemplates that the elastomeric intermediate layer will be coextruded with the tread band to create a uniform product. Coextrusion permits the correct orientation of the elastomeric intermediate layer to the tread band during construction. It also permits the correct orientation of the reinforcing fibers so that they lie substantially in the same equatorial direction as the 0° nylon cords that they replace.

DESCRIPTION OF THE DRAWINGS

The accompanying drawings, which are incorporated in and constitute part of the specification, illustrate several embodiments of the present invention. Together with the general description given above and the detailed description of the embodiments given below, the drawings serve to explain the principles of the present invention.

In the drawings.

DETAILED DESCRIPTION OF THE EXEMPLARY EMBODIMENTS

Additional advantages and modifications of the present invention will readily occur to those skilled in the art.

Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

Figure 1:
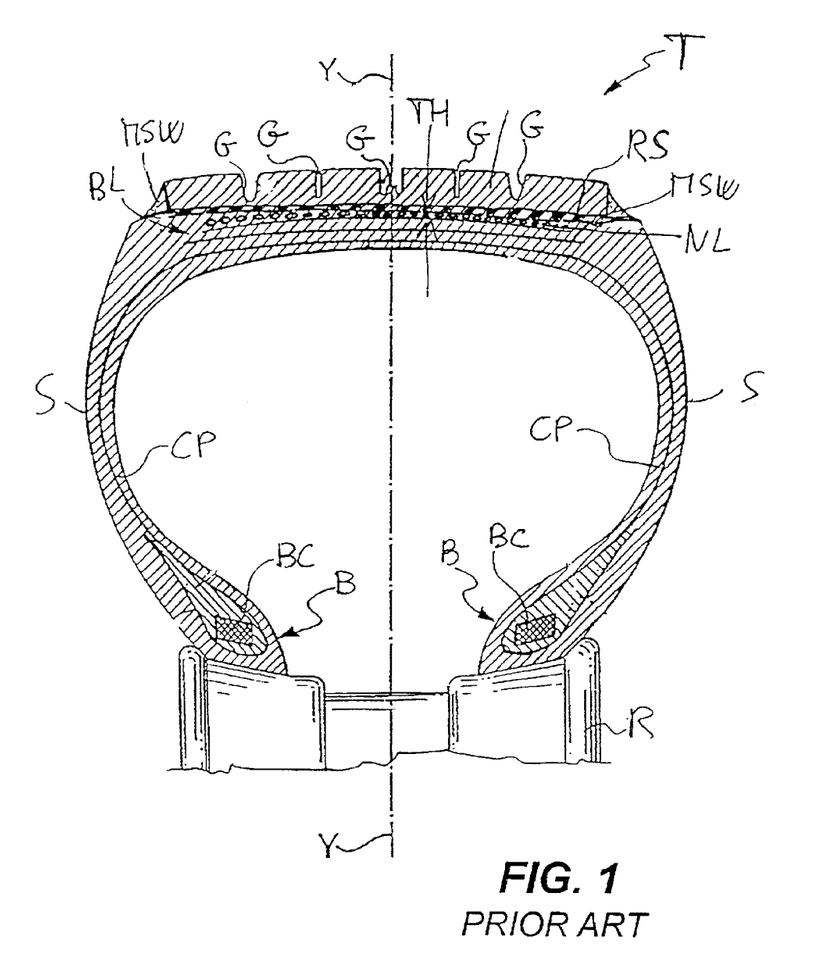
FIG. 1 illustrates a cross-section of a first traditional tire design, showing the rubber sheet disposed between the 0° nylon layer and the tread band according to the prior art.

FIG. 1 illustrates a tire T according to a first example in the prior art. Conventionally a tyre T comprises at least one carcass ply CP the opposite side edges of which are folded up around corresponding anchoring bead cores BC, each incorporated in a bead B defined along an inner circumferential edge of the tyre T at which the engagement of the tyre T itself on a mounting rim R being part of a vehicle wheel takes place. Applied to the carcass ply CP along the circumferential extension thereof is one or more belt layers BL made of textile or metal cords incorporated in a rubberized sheet. Usually, the belt layers BL are three: the first two, near to the carcass ply CP are made of rubberized fabric comprising cords, preferably metallic cords, that crisscross each other and are both angled with respect to the equatorial plane Y—Y of the tire T. Over the two metallic belt layer is placed a layer NL of rubberized fabric containing reinforcing cords, preferably of a textile material, and more preferably of a heat-shrinkable material, such as nylon, oriented at 0° (i.e., in a circumferential direction) with respect to the equatorial plane of the tire.

Also applied to the external surface of the carcass ply CP at respective opposite side positions thereof is a pair of sidewalls S each of which substantially extends from the bead B until the so-called "shoulder" region of the tyre, defined in the vicinity of the end edges of the belt layers.

A tread band T is circumferentially disposed around the belt layers BL, the side edges of said tread band terminating at the shoulders and being connected to the sidewalls S. The tread band TB externally exhibits a rolling surface arranged to act in contact relationship on the ground, in which surface circumferential grooves G alternating with the transverse cut-outs may be formed. Said grooves G define a plurality of blocks distributed in one or more circumferential rows.

As shown, the tread band TB is disposed adjacent and above a rubber sheet RS. Rubber sheet RS typically has a thickness of 0.2 to 1.0 mm and extends almost the entire width of tread band TB. Disposed at either end of tread band TB are mini side walls MSW, which are known to those skilled in the art. In the traditional tire, a nylon layer NL is disposed just below rubber sheet RS and the two layers have a combined thickness TH.

Of course, the rubber sheet RS, in this case, can be omitted if the tread band TB exhibits a sufficient tackiness.

Figure 2:
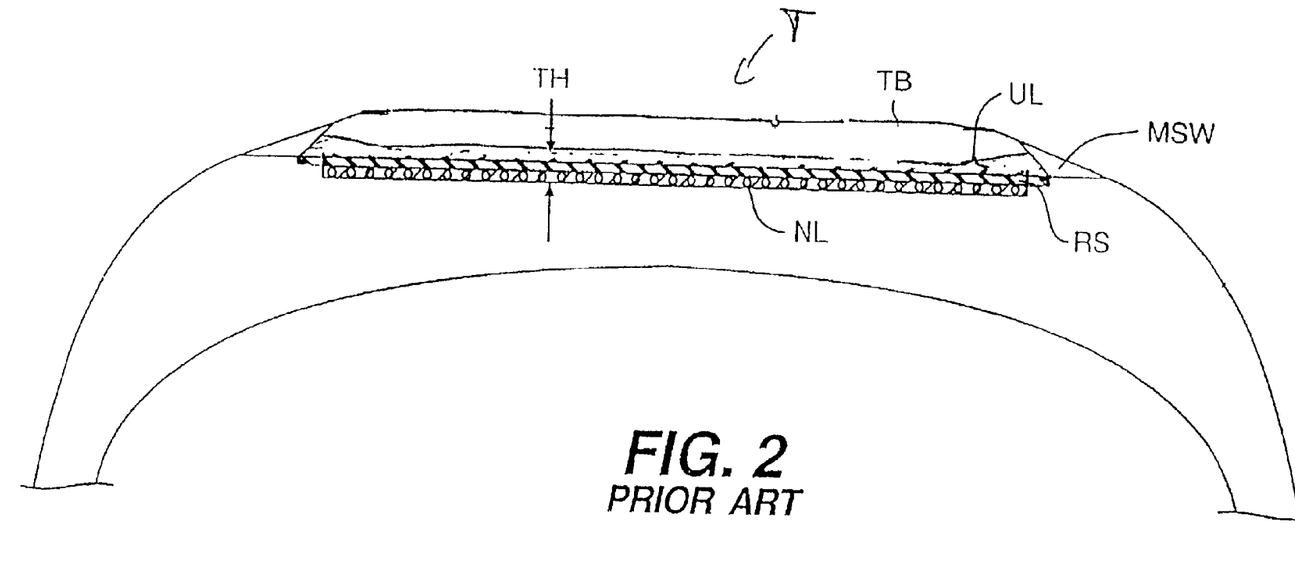
FIG. 2 illustrates a cross-section of a second traditional tire design, showing the underlayer, rubber sheet, and 0° nylon layer between the tread band and the carcass.

FIG. 2 illustrates a partial construction of a tire T according to a second example in the prior art. As shown, tread band TB includes an underlayer UL at its lowermost portion above rubber sheet RS. Underlayer UL is usually between about 1 mm to 2 mm thick, but in any event, underlayer UL is not thick enough that it comes into contact with the road when the tire tread wears out. This is desirable because the composition of underlayer UL differs from that of tread band TB and, therefore, does not have the same operational characteristics as tread band TB. As in the first prior art example, nylon layer NL is disposed below rubber sheet RS. Underlayer UL, rubber sheet RS, and nylon layer NL have a combined thickness TH. As in the first example, mini-side walls MSW may be disposed at either lateral edge of tread band TB.

Of course, also in this case, the rubber sheet RS can be omitted if the underlayer UL exhibits a sufficient tackiness.

As is known in the art, rubber sheet RS is typically composed of an elastomeric compound material based on a combination with natural rubber that is well known in the art. Generally, a sufficient tackiness of the rubber sheet RS is given by an amount of natural rubber greater than 50% of the polymer amount. Other additives can be added to the compound of the rubber sheet RS in order to get a permanent sufficient tackiness. In this way the tread band TB (whether it contains underlayer UL or not) will stick to underying layer during construction. In each example, rubber sheet RS is applied as a sheet to the underside of tread band TB (or tread band TB with underlayer UL). The layers below rubber sheet RS are typically nylon layer NL followed by the two belted plies and the carcass plies (not shown).

In the conventional example, rubber sheet RS is manufactured separately from tread band TB of tire T. Rubber sheet RS is usually a calendered sheet of material that is applied to the underside of tread band TB (or tread band TB with underlayer UL) after its extrusion. Rubber sheet RS can be also coextruded with the treat band TB. Rubber sheet RS and tread band TB (or tread band TB and underlayer UL) together to the other elements of the tire, form a completed green tire that is vulcanized to produce a complete and integrated tire product.

Figure 3:
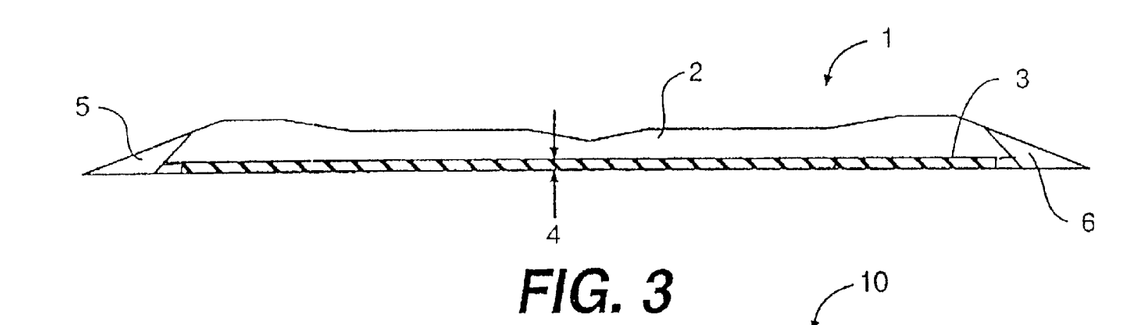
FIG. 3 illustrates a cross-section of a tire according to the first embodiment of the present invention, showing the placement of a substantially uniform elastomeric intermediate layer below the tread band.

In contrast to the prior art and as shown in the first embodiment of the present invention illustrated in FIG. 3, tread band 1 includes external portion 2 disposed over elastomeric intermediate layer 3. Elastomeric intermediate layer 3 has a substantially uniform thickness 4 across its width. External portion 2 may also include mini side wall portions 5, 6 at either outermost end. The thickness of elastomeric intermediate layer 3 is greater that 1 mm and preferably is between about 1.5 to 2 mm. In any case, the thickness of external portion 2, having regard to the maximum depth of the grooves of the tread pattern, should not permit elastomeric intermediate layer 3 to contact the road surface when the tire tread wears out. Tread band 1, manufactured in accordance with the present invention, is then incorporated into the structure of a tire.

Figure 4:
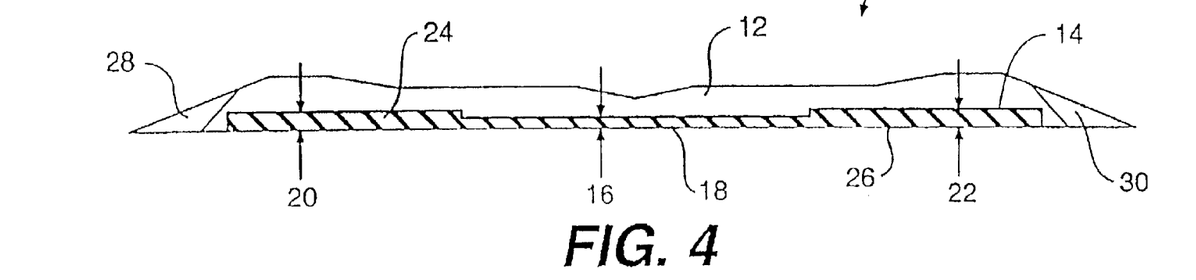
FIG. 4 illustrates a second embodiment of the present invention, showing thicker regions at the edges of the elastomeric intermediate layer.

The second embodiment of the present invention is illustrated in FIG. 4, showing tread band 10 with external portion 12 disposed over elastomeric intermediate layer 14. Elastomeric intermediate layer 14 has a variable thickness from thickness 16 of central portion 18 to thicknesses 20, 22 of edge portions 24, 26. External portion 12 may also include mini side wall portions 28, 30 at either outermost end. Thickness 16 of central portion 18 is greater that 1 mm and preferably between 1.5 mm and 2 mm, while to thicknesses 20, 22 of edge portions 24, 26 are greater that 1 mm and preferably between 1.5 mm and 3 mm, anyway greater than thickness 16. In any case, the various thicknesses of external portion 12, having regard to the maximum depth of the grooves of the tread pattern, should not permit elastomeric intermediate layer 14 to contact the road surface when the tire tread wears out. While this embodiment of the present invention contemplates that thicknesses 20, 22 are the same, those skilled in the art will readily recognize that thicknesses 20, 22 may differ from one another, depending on the tire design, to vary the operational characteristics of the inner and outer edges of tread band 10 without departing from the scope and spirit of the present invention.

Figure 5:
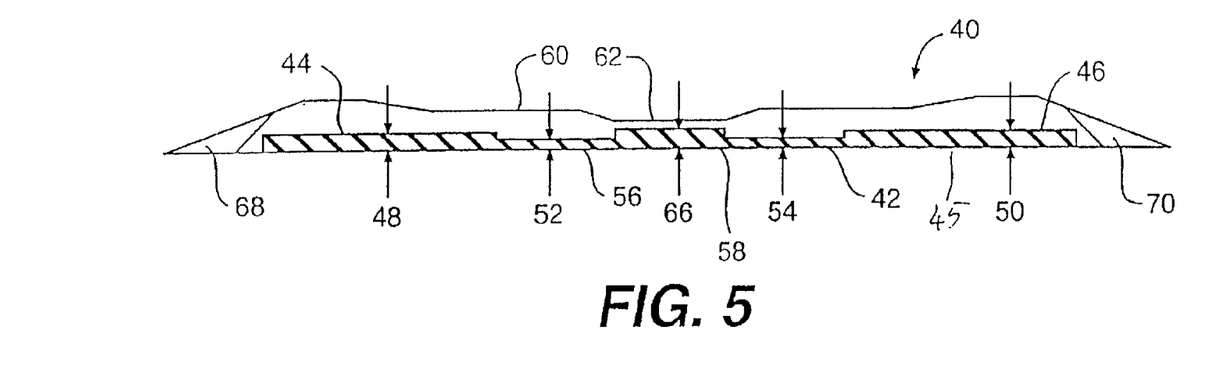
FIG. 5 illustrates a third embodiment of the elastomeric intermediate layer where thicker regions are disposed across the width of the tread band where the grooves in the tread band create points of deflection for which the thicker portions of the elastomeric intermediate layer compensate.

In the third embodiment of the present invention, as shown in FIG. 5, tread band 40 may include an elastomeric intermediate layer 46 with additional sections of variable thickness. As shown in FIG. 5, tread band 40 may include elastomeric intermediate layer 46 with edge portions 44, 45 having thicknesses 48, 50 greater than a base thickness 52, 54 of base portions 56, 42. Furthermore, at a region of external portion 60 incorporating a wide groove 62, an intermediately thicker portion 58 with a thickness 66 greater than that of the base portions 56, 42 may also be included. Intermediately thicker portion 58 of elastomeric intermediate layer 46 compensates for a disproportionately higher stress in the region of wide groove 62 when tread band 40 rotates, because wide groove 62 acts as a deflection point in tread band 40 where stresses can accumulate during operation, especially at high speeds. The thickness of the various portions of elastomeric intermediate layer 46 follow the same general rules as in the previous example. The base portions 56, 42 are greater than 1 mm and preferably between 1.5 mm and 2 mm thick while edge portions 44, 45 and intermediately thicker portion 58 are greater than 1 mm and than base portions 56, 42 and preferably between 1.5 mm and 3 mm thick. In any case, the thickness of external portion 60, having regard to the maximum depth of the grooves of the tread pattern, should not permit elastomeric intermediate layer 46 to contact the road surface when the tire tread wears out.

In the preferred embodiment of the present invention, the cross-sectional profile of elastomeric intermediate layer 46 is symmetrical. However, while it is contemplated that thicknesses 48, 50 of edge portions 44, 45 are the same as one another, thicknesses 48, 50 may be designed to differ from one another. Similarly, while the present invention contemplates that thickness 66 of intermediately thicker portion 58 is the same as that of edge portions 44, 45, the thicknesses of each of these portions may differ from one another depending on the operational characteristics desired for the particular tire design. Furthermore, while it is contemplated that thicknesses 52, 54 of base portions 56, 42 are the same, they also may differ from one another, as would be understood by those skilled in the art.

In the third embodiment of the present invention, while only one intermediately thicker portion 58 is shown in relation to wide groove 62, many such portions may be disposed across the width of tread band 40, should tread band 40 incorporate more than one wide groove 62. Finally, mini side walls 68, 70 may be included in the construction of tread band 40, just as in the previous example.

The construction of the elastomeric intermediate layer in either of the three embodiments shown will now be described. It is understood that the following description applies to all of the embodiments contemplated by the present invention. This can be accomplished through extrusion or calendaring, as described in greater detail below.

In the construction of the present invention, it is preferred to place the elastomeric intermediate layer in the space traditionally occupied by the underlayer, as the three examples of the present invention illustrate. Placement of the felted layer in this location permits the construction of a tire that is lighter (in weight) than the traditional tire but which retains the handling characteristics of the traditional tire. It is possible, however, to position the felted layer in the tire in the location traditionally occupied by the 0° nylon layer. In such an example, the performance advantages of the elastomeric intermediate layer can be realized but the overall weight of the tire will not be reduced significantly as compared with the traditional tire.

It is preferred that the reinforcing fibers be aramid fibers, whether they are Kevlar®, Twaron®, or some other material. Specifically, it is preferred that the reinforcing fibers have a trunk portion with a diameter of about 10 microns ($\mu$m) and a length of about 200 microns ($\mu$m). This gives the reinforcing fibers an aspect ratio of about 20, which is the ratio of the length to the diameter of the fibers. Extending outwardly from the trunk portion, the reinforcing fibers also contain numerous branches or fibrils that have diameters smaller than the diameter of the trunk portion.

A discussion of the structure of these fibers is found in U.S. Pat. No. 4,871,004, which is incorporated herein by reference. According to this patent, Kevlar® products, such as Kevlar® 29 (a specific Kevlar® pulp product) is available in staple length and as a pulp, and, according to 'Modern Plastics Encyclopedia', is a low density, high strength aramid fiber. According to DuPont's description, fibers of Kevlar® consist of long molecular chains produced from poly-paraphenylene terephthalamide. The chains are highly oriented with strong interchain bonding which result in a unique combination of properties.

While the following discussion will focus specifically on Kevlar® fibers, since they are the preferred reinforcing agent, it should be understood that Twaron® fibers may be substituted, in whole or in part, for Kevlar® fibers without deviating from the scope and spirit of the present invention. According to Akzo Nobel, Twaron® fibers are lightweight, super-strong synthetic fibers made from an aramid polymer. The aramid molecules are characterized by relatively rigid polymer chains linked by strong hydrogen bonds, which transfer mechanical stress back and forth, rather like a zipper. Finally, other aramid fibers with similar branching fibrils may be substituted for Kevlar® or Twaron®, as would be understood by those of skill in the art, without deviating from the scope and spirit of the present invention.

Moreover, regardless of the fibers used, they are preferably oriented substantially in the same direction as the 0° nylon cords in the traditional tire examples so that the fibers improve their intended function.

The Kevlar® fibers used in the preferred embodiments of the present invention were dispersed in natural rubber (NR), the resulting mixture being known as "Kevlar® pulp," which is also a commercial product of DuPont.

The use of Kevlar® pulp, as masterbatch, greatly contributes to the success of the present invention, as would be understood by those of skill in the art, because it provides certain advantages in the manufacturing process.

It should also be understood that both Kevlar® and Twaron® are available as pulps from their respective manufacturers. A pulp containing either aramid fiber is a pre-mixed combination of the aramid fiber and rubber. The use of an aramid pulp is preferred because pulps are easier to mix into the elastomeric compound than raw aramid fibers, in order to improve the homogeneity of the fibers distributed in the rubber compound used to construct the elastomeric intermediate layer of the present invention. Raw aramid fibers, due to their branching structure, are very fluffy and mix with the elastomeric compound only after some effort.

The compound created for the elastomeric intermediate layer of the present invention can be described by the amount of aramid fibers that are added to the mixture. Since the compound is expressed in terms of parts per hundred of rubber, the abbreviation "phr" is commonly used.

Preferably, the amount of fibers is between about 5 and 15 phr. More preferably, the amount of fibers is between about 7 and 11 phr. Most preferably, the amount of aramid fibers is about 9 phr.

There are different Kevlar® fibres masterbatches available from Du Pont. The most commonly known and used, which is often referred to as Kevlar® Pulp, is a mixture of 77% Natural Rubber (NR) and 23% fibres.

When fibres are added as Kevlar® Pulp, they can reach the indispensable level of dispersion in the rubber matrix to be effective in the present invention. The amount of NR thus introduced in the compound is counted into the overall quantity of rubber.

The rubber compound may be composed of any of a number of different materials that can be vulcanized to give rubber elastomers. For example, any one or a combination of the following can be used: natural rubber (NR), isoprene rubber (IR), emulsion-polymerized styrene butadiene rubber (E-SBR), solution polymerized SBR (S-SBR), butadiene rubber (BR), and the like.

For the present invention, a combination of NR and E-SBR is preferred. While the best results found were obtained with NR, unfortunately the use of an all-NR mixture was ruled out because of the troubles encountered when the compound was extruded. The temperature needed to extrude the NIR product was simply too high. Experiments showed that a suitable compromise was obtained with a blend of about 60% NR and about 40% E-SBR. The compound material may comprise greater than about 50% natural rubber.

Carbon black (CB) is a standard filler for the construction of tires. It was found that better properties for the tire were obtained when CB from the N300 series (ASTM nomenclature; Iodine adsorption between about 65 and 95 mgI/gCB (ISO 1304/85), DBP between about 70 and 125 ml/100 gCB (ISO 4656/92)) was used as filler for the mixture. Through experiment, the amount of CB was preferred to be between about 30 and 80 phr and even more preferred between about 50 and 70 phr. In the present invention, it was most preferred to include about 60 phr of CB N326.

The presence of cross-linking resins, e.g., resorcinol-formaldehyde resin with aromatic polyamidic fibers, is known to have a beneficial effect on the resulting compound. A detailed formulation of one compound used for tire trials, Compound A, is set forth below in Table 1.

TABLE 1

| COMPOUND "A" | | | |
|---|---|---|---|
| INGREDIENT | DESCRIPTION | phr | % |
| NR | | 30.0 | 14.45 |
| E-SBR 1712 | 23% bound styrene | 55.0 | 26.49 |
| Carbon Black (N300 Series) | N300 Series | 60.0 | 28.90 |
| Zinc Oxide | | 8.00 | 3.85 |
| Crystex OT 33 | Insoluble Sulphur 67% (oiled) | 5.25 | 2.53 |
| Cyrez 963 | Hexamethoxymethylmelamine 65% silica supported | 5.00 | 2.41 |
| Resorcinol 80 | 80% polymer supported | 1.88 | 0.91 |
| DCBS | N,N' dicyclobenzothiazolsulphamide | 1.50 | 0.72 |
| 6 PPD | Paraphenilendiamine | 2.00 | 0.96 |
| Kevlar ® Pulp | 23% Kv, 77% NR masterbatch | 39.0 | 18.78 |
| TOTAL | | 207.63 | 100.00 |

As Table#1 list, the compound contains 39 phr of Kevlar® Pulp (23% Kv, 77% NR), which means there are 30 phr of NR and 9 phr of Kevlar® fibres.

Compound A, was then, preferably, coextruded with the tread band and mini sidewall compounds. Coextrusion was preferred, among other reasons, because the thickness required for base Compound A, in the tire specification to be tested, was too high for calendering. In addition, coextrusion permitted orientation of the fibers in substantially circumferential direction, i.e. the same direction as the 0° nylon cords of the traditional tire construction. Furthermore, coextrusion was preferred because it permitted the layer made from Compound A to be shaped with a variable thickness, as shown in FIG. 4 or FIG. 5. For example, as shown in FIG. 4 and as described, the thicknesses 20, 22 of edge portions 24, 26 was about 33% greater than the thickness 16 of center portion 18.

The coextrusion of Compound A, together with mini side walls 28, 30 was accomplished with the use of a die specially designed for this purpose. More than one version of the die has to be used for each profiles to produce the final shape of the layer made of Compound A.

The coextrusion process was controlled through the speed of the master conveyor and the extrudate temperature was controlled so that it did not exceed 120° C. Controls were also applied so that the extrudate dimensions could be maintained for the specified values or ranges of the tire to be tested. Due to the reinforcing action of the fibers in Compound A, it was found that Compound A does not swell when extruded outside of the die. In other words, Compound A keeps essentially the same dimensions once it leaves the extruder. Because of this, the viscosity of the compound had to be optimized.

The extrusion plant used a triplex extruder with the following characteristics: (1) for the tread body, a screw diameter of 150 mm, (2) for the base body, a screw diameter of 120 mm, and (3) for the mini side wall body, a screw diameter of 90 mm. The barrel, screw, and head of each body was thermoregulated during the process.

Once a tire was constructed according to the mixing and extruding steps as described above, pneumatic tires (175/65 R14 T) were built having a reinforcing layer under the tread band made of Compound A. Experiments were then conducted with the resulting tires and compared with other similar tires to evaluate the effectiveness of the construction of the present invention.

First, a traditional tire was tested (Tire I). Second, a tire (Tire II) in which the rubber sheet and the underlayer were replaced by an elastomeric intermediate layer made with Compound A, was tested. Third, a tire (Tire III), like Tire II, with the nylon 0° ply removed, was tested. In the third example, the thickness of Compound A was increased 30% above the underlayer thickness. In the third example, the range of the thickness of Compound A was between 17% and 27% of the total combined thickness of the coextruded semifinished tread, mini side wall, and base Compound A. In this case, the underlayer was about 2 mm thick. Fourth and finally, a tire (Tire IV) was constructed like Tire III. In such fourth example, Compound A was shaped according to the present invention as shown in FIG. 4. The range of the thickness of Compound A in the center tread area was the same as for Tire III. At the edge of the elastomeric intermediate layer, the edge was between 25% and 50% thicker than the total thickness of the coextruded semifinished product of tread including Compound A. In the case of Tire IV, the underlayer was 2 mm thick at the center portion and 3 mm thick at the edge portions. The four tires described above were then tested in several ways.

First, a High Speed Integrity Test was conducted. The test is done on a tire rotating on drum, having the diameter of 2 m, with a load equal to 394 Kg, and with a air pressure of 2.5 bar. For a tire, as in our test, having a T speed class, the tire is rotated for 60 minutes at 190 Km/h, then the speed is increased of 10 Km/h every 10 minutes, until the tire breaks. All tires were able to pass the integrity test limit (10 minutes at 200 km/h). However, in the case of Tire III, the test was terminated earlier than the other tires (2 minutes at 220 km/h). The early termination of the test of Tire III indicates that, without the nylon 0° ply, a constant thickness of the base layer was less efficient than other designs, even with the highly reinforced base made from Compound A. It should be noted that this does not mean that the design of Tire III is unsuitable for use, only that other designs, such as Tire IV, were preferred. All other tires reached at least 230 km/h. This confirmed that Tire IV, including the advantages of the present invention, where the edge portions were made 33% thicker than the center portion of the base layer, was the preferred embodiment. In other words, Tire IV, which incorporated the elastomeric intermediate layer of the present invention, successfully replaced the conventional nylon and rubber sheets without sacrificing tire performance.

Second, a Rolling Resistance (RR) Test was conducted on Tires I, II, III, and IV. It was determined that the addition of Compound A to the tire was advantageous in every example, even though the range of its effectiveness varied as a function of the speed and structure chosen. Tires I and II displayed the same RR up to a medium speed (<120 km/h), whereas at higher speed Tire II showed less RR. The weights of Tires I and II were equal, and therefore, improvements in RR were shown to depend solely on Compound A. Tires III and IV were lighter than Tires I and II because they did not include the nylon 0° ply, and at low speeds, both tires exhibited a low RR. At high speeds, Tire III displayed an increased RR. Tire IV, with the further improvement to Tire III, exhibited the similar RR as Tire I. In this case, it was found that, without the nylon 0° ply, Compound A was able to maintain most of the original stability present in the traditional tire, but the test showed that Compound A benefitted from the additional stability provided by the structural modification of being thicker at the edge portions.

Third and finally, an Outdoor Test was conducted using Tires I, II, III and IV. In this test, several driving conditions were evaluated to establish the effects of Compound A and the new structure. The test established that it is preferred for the shape of the layer made from Compound A to be modified as shown in FIG. 4 to help recover the properties lost when the nylon 0° ply is is removed. Dry handling performance was found to have improved in each example where Compound A was incorporated in the tire construction, regardless of the structure. The improvement was moderate but noticeable, and particularly remarkable in Tire IV. This conclusion was verified also in soft handling conditions. Comfort tests showed improvement only for Tire II, whereas no appreciable difference was observed for Tires III, and IV, which again supports the conclusion that the inclusion of the elastomeric intermediate layer made from Compound A successfully replaced the rubber sheet and nylon layer of the traditional tire without sacrificing performance. The present invention provides a new construction for tires that compensates for the removal of the nylon 0° ply. Moreover, the present invention permits the construction of a lighter tire that is easier to manufacture but does not lose the handling characteristics that the nylon 0° ply provides.

TABLE 3

Test Results on Tires of the Type 175/65 R14 T

|  | Tire I NP | Tire II +Kv | Tire III −Ny 0° +Kv | Tire IV −Ny 0° +Kv var. thick |
|---|---|---|---|---|
| Soft Handling | 5.1 | 6 | 5.4 | 5.6 |
| Dry Handling | 5.8 | 6 | 6 | 6.5 |
| Comfort | 5.3 | 5.8 | 5.3 | 5.1 |
| Rolling Resistance (80 km/hr) | 9.25 | 9.25 | 8.93 | 8.92 |
| Rolling Resistance (160 km/hr) | 11.78 | 11.33 | 12.39 | 12.0 |
| Time (Velocity) | 1' (240 km/hr) | 6' (230 km/hr) | 2' (220 km/hr) | 10' (220 km/hr) |

In Table #3, "−Ny 0°" means the nylon layer was missing, "NP" refers to the prior art tires described at the beginning of the text, "+Kv" means Kevlar® pulp was added, "+Kv var. thick" means that the Kevlar® pulp was added and that the layer had a variable thickness, and "1' (240 km/hr)" means that after 1' at the speed of 240 km/hr, the tire was "destroyed".

Additional advantages and modification will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A pneumatic tire for a vehicle wheel, comprising:
   a carcass;
   a tread band;
   sidewalls;
   beads for anchoring the tire on a rim of the wheel; and
   a belt structure between the carcass and the tread band;
   wherein the tread band comprises grooves on a surface of the tread band;
   wherein the tread band is disposed in a radially-outer position relative to the carcass;
   wherein a fiber-reinforced elastomeric intermediate layer is disposed between the belt structure and the tread band,
   wherein the elastomeric intermediate layer comprises, in cross-section, two edge portions thicker than a central portion,
   wherein each edge portion comprises substantially-constant thickness,
   wherein the edge portions are both greater than or equal to about 25% thicker than the central portion, and
   wherein the edge portions are both less than or equal to about 75% thicker than the central portion.

2. The tire of claim 1, wherein the edge portions are both about 33% thicker than the central portion.

3. The tire of claim 1, wherein the elastomeric intermediate layer is coextruded with the tread band prior to vulcanization of the tire.

4. The tire of claim 1, wherein the belt structure comprises at least two layers of rubberized fabric comprising cords,
   wherein the cords of a first layer crisscross the cords of a second layer, and
   wherein the cords of the first and second layers are angled with respect to an equatorial plane of the tire.

5. The tire of claim 1, wherein the tire does not include, between the belt structure and the tread band, a layer of rubberized fabric with longitudinal reinforcing cords lying at an angle of substantially 0° with respect to an equatorial plane of the tire.

6. The tire of claim 1, wherein the tire excludes, between the belt structure and the tread band, a zero-degree layer, a tread underlayer, or a zero-degree layer and a tread underlayer.

7. The tire of claim 1, wherein the elastomeric intermediate layer is an only layer placed between the belt structure and the tread band.

8. The tire of claim 1, wherein the tire excludes a rubber sheet on an underside of the tread band or on an underside of an underlayer of the tread band.

9. The tire of claim 1, wherein the elastomeric intermediate layer further comprises a thickness greater than 1 mm.

10. The tire of claim 1, wherein the elastomeric intermediate layer further comprises a compound material and short reinforcing fibers.

11. The tire of claim 10, wherein the short reinforcing fibers comprise an aramid polymer.

12. The tire of claim 10, wherein the short reinforcing fibers are oriented at an angle of substantially 0° with respect to an equatorial plane of the tire.

13. The tire of claim 10, wherein the compound material comprises one or more of natural rubber, isoprene rubber, emulsion-polymerized styrene butadiene rubber, solution polymerized styrene butadiene rubber, and butadiene rubber.

14. The tire of claim 10, wherein a concentration of the short reinforcing fibers in the compound material is greater than or equal to about 5 phr and less than or equal to about 15 phr.

15. The tire of claim 10, wherein a concentration of the short reinforcing fibers in the compound material is greater than or equal to about 7 phr and less than or equal to about 11 phr.

16. The tire of claim 10, wherein the compound material comprises greater than about 50% natural rubber.

17. The tire of claim 10, wherein the compound material comprises carbon black in an amount greater than or equal to about 20 phr and less than or equal to about 80 phr.

18. The tire of claim 10, wherein the short reinforcing fibers comprise aramid fibers produced from polyparaphenylene terephthalamide.

19. The tire of claim 10, wherein the short reinforcing fibers comprise numerous branches or fibrils extending outwardly from a trunk portion.

20. The tire of claim 10, wherein the compound material comprises carbon black in an amount greater than or equal to about 50 phr and less than or equal to about 70 phr.

21. The tire of claim 10, wherein the compound material comprises carbon black in an amount equal to about 60 phr.

22. The tire of claim 10, wherein the elastomeric intermediate layer further comprises a thickness greater than or equal to about 1.5 mm and less than or equal to about 3.0 mm.

23. The tire of claim 10, wherein the elastomeric intermediate layer further comprises a thickness greater than or equal to about 1.5 mm and less than or equal to about 2.0 mm.

24. The tire of claim 10, wherein a concentration of the short reinforcing fibers in the compound material is about 9 phr.

25. A pneumatic tire for a vehicle wheel, comprising:
a carcass;
a tread band;
sidewalls;
beads for anchoring the tire on a rim of the wheel; and
a belt structure between the carcass and the tread band;
wherein the tread band comprises grooves on a surface of the tread band;
wherein the tread band is disposed in a radially-outer position relative to the carcass;
wherein a fiber-reinforced elastomeric intermediate layer is disposed between the belt structure and the tread band,
wherein the elastomeric intermediate layer comprises, in cross-section, two edge portions thicker than a central portion,
wherein the elastomeric intermediate layer further comprises a width,
wherein the edge portions each comprise about ⅖ths of the width, and
wherein the central portion comprises a remaining about ⅗ths of the width.

26. The tire of claim 25, wherein the elastomeric intermediate layer is coextruded with the tread band prior to vulcanization of the tire.

27. The tire of claim 25, wherein the belt structure comprises at least two layers of rubberized fabric comprising cords,
wherein the cords of a first layer crisscross the cords of a second layer, and
wherein the cords of the first and second layers are angled with respect to an equatorial plane of the tire.

28. The tire of claim 25, wherein the tire does not include, between the belt structure and the tread band, a layer of rubberized fabric with longitudinal reinforcing cords lying at an angle of substantially 0° with respect to an equatorial plane of the tire.

29. The tire of claim 25, wherein the tire excludes, between the belt structure and the tread band, a zero-degree layer, a tread underlayer, or a zero-degree layer and a tread underlayer.

30. The tire of claim 25, wherein the elastomeric intermediate layer is an only layer placed between the belt structure and the tread band.

31. The tire of claim 25, wherein the tire excludes a rubber sheet on an underside of the tread band or on an underside of an underlayer of the tread band.

32. The tire of claim 25, wherein the elastomeric intermediate layer further comprises a thickness greater than 1 mm.

33. The tire of claim 25, wherein the elastomeric intermediate layer further comprises a compound material and short reinforcing fibers.

34. The tire of claim 33, wherein the short reinforcing fibers comprise an aramid polymer.

35. The tire of claim 33, wherein the short reinforcing fibers are oriented at an angle of substantially 0° with respect to an equatorial plane of the tire.

36. The tire of claim 33, wherein the compound material comprises one or more of natural rubber, isoprene rubber, emulsion-polymerized styrene butadiene rubber, solution polymerized styrene butadiene rubber, and butadiene rubber.

37. The tire of claim 33, wherein a concentration of the short reinforcing fibers in the compound material is greater than or equal to about 5 phr and less than or equal to about 15 phr.

38. The tire of claim 33, wherein a concentration of the short reinforcing fibers in the compound material is greater than or equal to about 7 phr and less than or equal to about 11 phr.

39. The tire of claim 33, wherein the compound material comprises greater than about 50% natural rubber.

40. The tire of claim 33, wherein the compound material comprises carbon black in an amount greater than or equal to about 20 phr and less than or equal to about 80 phr.

41. The tire of claim 33, wherein the short reinforcing fibers comprise aramid fibers produced from poly-paraphenylene terephthalamide.

42. The tire of claim 33, wherein the short reinforcing fibers comprise numerous branches or fibrils extending outwardly from a trunk portion.

43. The tire of claim 33, wherein the compound material comprises carbon black in an amount greater than or equal to about 50 phr and less than or equal to about 70 phr.

44. The tire of claim 33, wherein the compound material comprises carbon black in an amount equal to about 60 phr.

45. The tire of claim 33, wherein the elastomeric intermediate layer further comprises a thickness greater than or equal to about 1.5 mm and less than or equal to about 3.0 mm.

46. The tire of claim 33, wherein the elastomeric intermediate layer further comprises a thickness greater than or equal to about 1.5 mm and less than or equal to about 2.0 mm.

47. The tire of claim 33, wherein a concentration of the short reinforcing fibers in the compound material is about 9 phr.

48. A pneumatic tire for a vehicle wheel, comprising:
a carcass;
a tread band;
sidewalls;
beads for anchoring the tire on a rim of the wheel; and
a belt structure between the carcass and the tread band;
wherein the tread band comprises grooves on a surface of the tread band;
wherein the tread band is disposed in a radially-outer position relative to the carcass;
wherein a fiber-reinforced elastomeric intermediate layer is disposed between the belt structure and the tread band,
wherein the elastomeric intermediate layer comprises cross-linking resin,
wherein the elastomeric intermediate layer further comprises, in cross-section, two edge portions thicker than a central portion,
wherein each edge portion comprises substantially-constant thickness, and
wherein the edge portions are both between about 25% to 75% thicker than the central portion.

49. The tire of claim 48, wherein the cross-linking resin comprises resorcinol-formaldehyde resin.

50. The tire of claim 48, wherein the elastomeric intermediate layer further comprises a thickness greater than 1 mm.

51. The tire of claim 48, wherein the elastomeric intermediate layer further comprises a thickness greater than or equal to about 1.5 mm and less than or equal to about 3.0 mm.

52. The tire of claim 48, wherein the elastomeric intermediate layer further comprises a thickness greater than or equal to about 1.5 mm and less than or equal to about 2.0 mm.

53. A pneumatic tire for a vehicle wheel, comprising:
a carcass;
a tread band;
sidewalls;
beads for anchoring the tire on a rim of the wheel; and
a belt structure between the carcass and the tread band;
wherein the tread band comprises grooves on a surface of the tread band;
wherein the tread band is disposed in a radially-outer position relative to the carcass;
wherein a fiber-reinforced elastomeric intermediate layer is disposed between the belt structure and the tread band,
wherein the elastomeric intermediate layer comprises cross-linking resin,
wherein the elastomeric intermediate layer further comprises, in cross-section, two edge portions thicker than a central portion,
wherein each edge portion comprises substantially-constant thickness, and
wherein the edge portions are both about 33% thicker than the central portion.

54. A pneumatic tire for a vehicle wheel, comprising:
a carcass;
a tread band;
sidewalls;
beads for anchoring the tire on a rim of the wheel; and
a belt structure between the carcass and the tread band;
wherein the tread band comprises grooves on a surface of the tread band;
wherein the tread band is disposed in a radially-outer position relative to the carcass;
wherein a fiber-reinforced elastomeric intermediate layer is disposed between the belt structure and the tread band,
wherein the elastomeric intermediate layer comprises cross-linking resin,
wherein the elastomeric intermediate layer further comprises, in cross-section, two edge portions thicker than a central portion,
wherein the elastomeric intermediate layer further comprises a width,
wherein the edge portions each comprise about 2/7ths of the width, and
wherein the central portion comprises a remaining about 3/7ths of the width.

55. The tire of claim 54, wherein the cross-linking resin comprises resorcinol-formaldehyde resin.

56. The tire of claim 54, wherein the elastomeric intermediate layer further comprises a thickness greater than 1 mm.

57. The tire of claim 54, wherein the elastomeric intermediate layer further comprises a thickness greater than or equal to about 1.5 mm and less than or equal to about 3.0 mm.

58. The tire of claim 54, wherein the elastomeric intermediate layer further comprises a thickness greater than or equal to about 1.5 mm and less than or equal to about 2.0 mm.

* * * * *